(12) United States Patent
Zhang et al.

(10) Patent No.: US 8,310,239 B2
(45) Date of Patent: Nov. 13, 2012

(54) DETECTING ELECTRICAL CURRENT IN A MAGNETIC STRUCTURE

(75) Inventors: Hong Zhang, El Sobrante, CA (US); Richard A. Rosthal, Richmond, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 368 days.

(21) Appl. No.: 12/581,947

(22) Filed: Oct. 20, 2009

(65) Prior Publication Data

US 2010/0134112 A1 Jun. 3, 2010

Related U.S. Application Data

(60) Provisional application No. 61/119,275, filed on Dec. 2, 2008.

(51) Int. Cl.
*G01V 3/10* (2006.01)

(52) U.S. Cl. ......... 324/339; 324/338; 324/342; 324/368

(58) Field of Classification Search ................... None
See application file for complete search history.

(56) References Cited

U.S. PATENT DOCUMENTS

| | | | | |
|---|---|---|---|---|
| 3,007,107 A * | 10/1961 | Gondouin | | 324/359 |
| 5,442,294 A * | 8/1995 | Rorden | | 324/339 |
| 5,654,639 A * | 8/1997 | Locatelli et al. | | 324/339 |
| 7,030,617 B2 | 4/2006 | Conti | | |
| 7,795,872 B2 | 9/2010 | Clark et al. | | |
| 2005/0242819 A1* | 11/2005 | Gold et al. | | 324/367 |
| 2009/0281731 A1 | 11/2009 | Morrison et al. | | |

* cited by examiner

*Primary Examiner* — Minh N Tang
(74) *Attorney, Agent, or Firm* — Jeremy Berman (57) ABSTRACT

A current sensor measures an electrical current flowing in well casing or other magnetic structure. The current sensor can be installed in a tool for performing electromagnetic (EM) induction surveying in a wellbore lined with an electrically conductive casing. The tool includes an EM element to transmit or receive a magnetic field through the casing. The measured current using the current sensor can be used to relate the change of casing effect on the EM element (e.g., an induction receiver) placed inside the well casing for performing the EM induction survey.

26 Claims, 7 Drawing Sheets

DETECTING ELECTRICAL CURRENT IN A MAGNETIC STRUCTURE

CROSS-REFERENCE TO RELATED APPLICATIONS

This application claims the benefit under 35 U.S.C. §119(e) of U.S. Provisional Application Ser. No. 61/119,275, entitled "Induction Coil Sensitivity Change Due to Axial Current Induced in Steel Casings," filed Dec. 2, 2008, which is hereby incorporated by reference.

BACKGROUND

Geological formations forming a reservoir for the accumulation of hydrocarbons or other fluids in the subsurface of the earth contain a network of interconnected paths in which fluids are disposed that may ingress or egress from the reservoir. To determine the behavior of the fluids in this network, knowledge of both the porosity and permeability of the geological formations is desired. From this information, efficient development and management of hydrocarbon reservoirs may be achieved. For example, the resistivity of geological formations is a function of both porosity and permeability. Considering that hydrocarbons are electrically insulating and most connate water contains salts and is highly conductive, resistivity measurements are a valuable tool in determining the presence of a hydrocarbon reservoir in the formations.

One technique to measure formation resistivity involves the use of electromagnetic induction using transmitters of low frequency magnetic fields which induce electrical currents in the formation. These currents in turn produce secondary magnetic fields which are measured by a magnetic field receiver.

The magnetic field receiver can be placed in a wellbore when performing a cross-well electromagnetic survey or surface-to-wellbore or wellbore-to-surface electromagnetic survey. A wellbore is typically lined with casing, which is usually made of steel. The magnetic permeability of steel casing is often non-linear and depends on a magnetizing field and frequency. The casing effect on a magnetic field receiver is strongly dependent on the magnetic permeability of steel casing. Since the magnetic property of steel casing can be modified by induced current from a source coupled through a formation during an electromagnetic induction survey, the effective sensitivity of the receiver inside the casing can also change. As a result, currents induced into casing may cause data distortion of electromagnetic induction surveying using receivers positioned in steel cased wellbores.

SUMMARY

A current sensor measures an electrical current flowing in a casing or other magnetic structure. The current sensor can be installed in a tool for performing electromagnetic (EM) induction surveying in a wellbore lined with an electrically conductive and magnetic casing. The tool includes an EM element to transmit or receive a magnetic field through the casing. The current measurement may be used to correct for a change in casing effect on the EM element.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

In accordance with some embodiments, a correction mechanism is provided to perform corrections of receiver measurements in a cased wellbore that are affected by induced current flowing in the casing in a longitudinal (axial) direction of the casing. A "casing" refers to any structure that lines a wellbore. In many implementations, the casing is formed of an electrically conductive and often magnetic material that allows current to flow through the casing. Axial currents do not directly affect a receiver designed to measure axial magnetic fields; however, if the casing is magnetic, the current will alter the magnetic properties of the casing and will affect the induction receiver placed inside. The current flowing in the casing is induced by a remote electromagnetic (EM) transmitter coupled through a subterranean formation. The correction mechanism according to some embodiments does not attempt to measure the casing effect itself, but rather makes corrections to the change of the casing effect due to the current flowing inside the casing. The casing effect refers to the effect of the casing on the magnetic field level that is detected by a magnetic field receiver (also referred to as an "EM receiver").

The sensitivity of a magnetic field receiver is strongly affected by an electrically conductive casing in a wellbore, due to the magnetic permeability and electrical conductivity of the casing. The magnetic permeability of casing may be non-linear and will be modified by the magnetic field due to current flowing in the casing. In cross-well and surface-to-wellbore EM surveys, receiver anomalies have been observed in some conditions when a receiver tool string is located inside an electrically conductive casing, especially when a receiver coil of the receiver tool string is near a casing collar or other casing inhomogeneity and/or when the source is close to a receiver well.

A cross-well survey refers to an EM induction survey where one or more EM transmitters are placed in a first wellbore, while one or more EM receivers are placed in a second wellbore to detect EM signals transmitted by the EM transmitter(s) and affected by the subterranean formation between the first and second wellbores. A surface-to-wellbore survey is an EM induction survey in which one or more EM transmitters are placed at or near the earth surface (e.g., land surface or sea floor) or towed in a body of water (for marine surveying), or towed in air above the surface (for air-borne surveying), and one or more EM receivers are placed in a wellbore to detect EM signals transmitted by the EM transmitter(s) and affected by the subterranean formation between the earth surface and the wellbore. A wellbore-to-surface survey is an EM induction survey in which one or more EM transmitters are placed in a wellbore and one or more EM receivers are placed near the surface to detect EM signals transmitted by the EM transmitter(s) and affected by the subterranean formation between the earth surface and the wellbore.

In accordance with an alternative embodiment, a mechanism can be provided to measure an eddy current in an electrically conductive casing around a coil of an EM transmitter or receiver. An eddy current refers to electric current induced entirely within a conducting material (in this case the casing) by varying electric or magnetic fields or by EM waves. In a cross-well survey, the effective magnetic moment of a coil of an EM transmitter or receiver inside the casing is greatly reduced by countering fields caused by eddy currents, as well as the magnetic shielding effect from the casing.

In accordance with some embodiments, one or more casing current sensors can be added to an EM receiver that is positioned in a cased wellbore. In a multi-receiver tool string, one or more casing current sensors can be added to each EM receiver in the multi-receiver tool string. Each current sensor can be used to measure current in the surrounding casing. In other embodiments, one or more casing current sensors can be provided in a transmitter tool string that includes one or more EM transmitters. The casing current sensor can be used to measure casing current around each EM transmitter. The design of these current sensors is unique with some embodiments described below.

Figure 1:
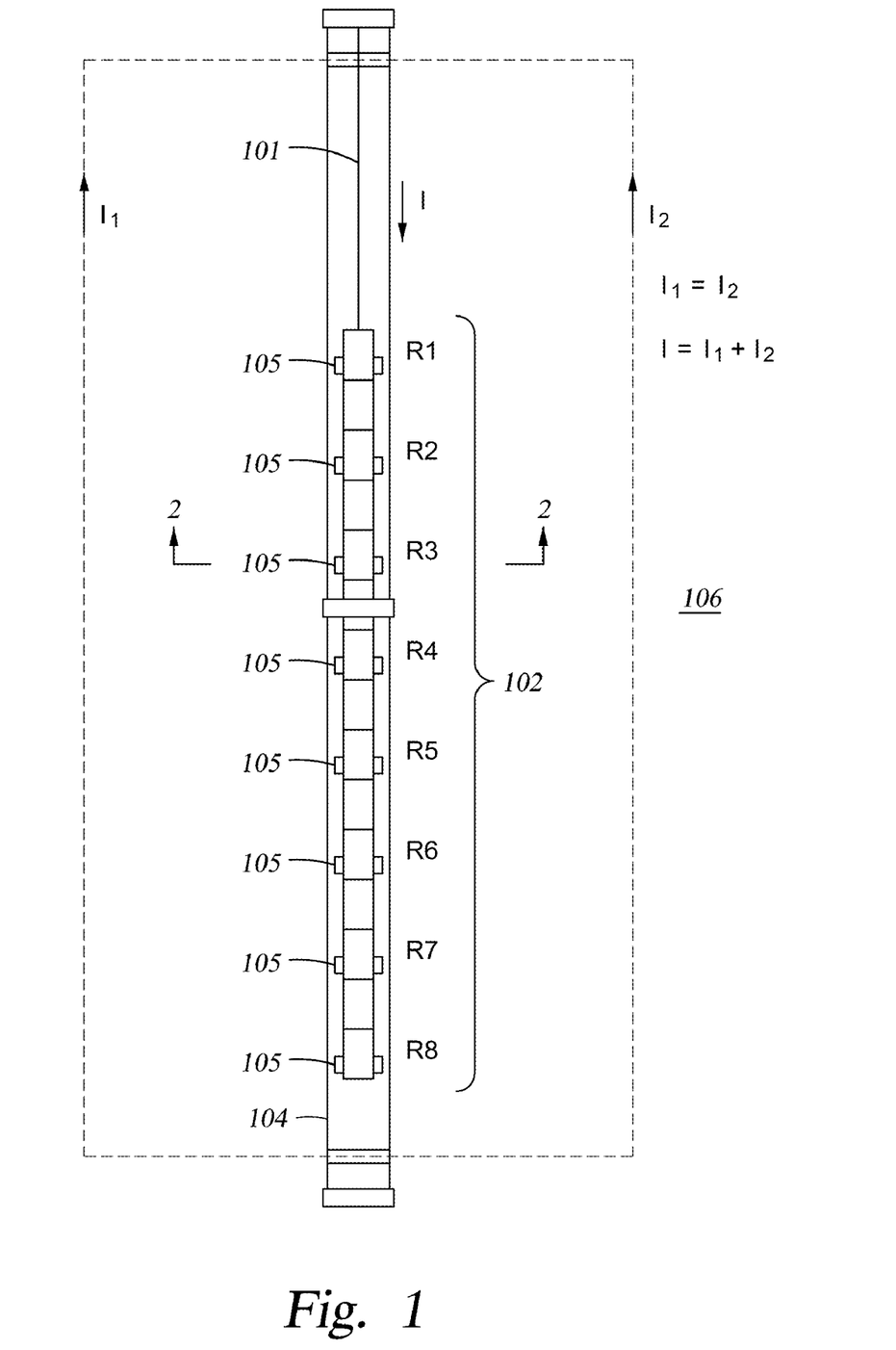
FIG. 1 is a schematic diagram of an exemplary arrangement that includes a receiver tool string according to an embodiment of the invention.

FIG. 1 is a schematic diagram of a receiver tool string 100 that has multiple EM receivers, where R1, R2, R3, ..., R8 are shown in the example of FIG. 1. Although eight EM receivers are shown in FIG. 1, it is noted that different numbers (one or greater than one) of receivers can be employed in other implementations. The receiver tool string 100 is lowered on a carrier structure 101 that includes an electrically conductive medium or other type of communications medium (e.g., optical medium). The communications medium allows for communication between the EM receivers R1-R8 and surface equipment (not shown).

As further shown in FIG. 1, an electrical current (I) flows in a downward direction along casing 102 that lines a wellbore 104. The electrical current (I) flows generally along a direction that is parallel to a longitudinal or axial direction of the casing 102. FIG. 1 also shows return currents I1 and I2, which are propagated in the opposite direction of I through a subterranean formation 106 surrounding the cased wellbore 104.

Figure 2:
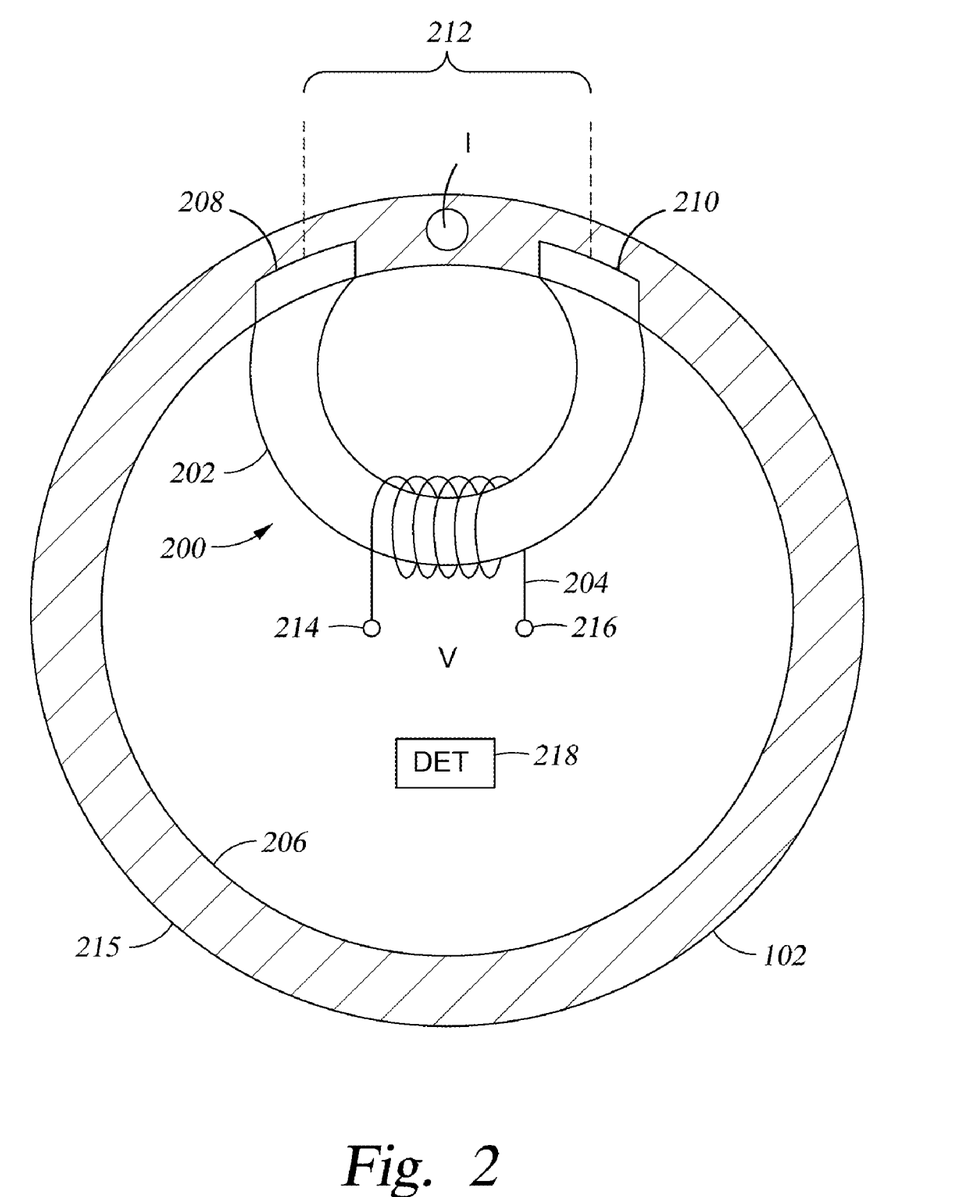
FIG. 2 is a cross-sectional schematic view of a current sensor in the receiver tool string, according to an embodiment.

FIG. 2 is a cross-sectional view of a portion of the casing 102 and the receiver tool string 100 of FIG. 1. The portion illustrated in FIG. 2 includes a casing current sensor 200 that is part of the receiver tool string 100. The casing current sensor 200 can be mounted on an expandable/retractable arm 105 of each of the EM receivers R1-R8 in FIG. 1. An arm 105 can be expanded to cause the corresponding casing current sensor 200 to move radially outwardly to engage the casing 102, and can be retracted to allow movement of the tool string 100 in the wellbore. The casing current sensor 200 includes a magnetic core 202 and a winding 204 (formed of an electrically conductive wire, for example) provided around the magnetic core 202. In FIG. 1, the casing current I runs into the page. The magnetic core 202 is generally C-shaped, in accordance with an embodiment. The C-shaped core 202 is in a plane that is generally perpendicular to the longitudinal axis of the casing 102 (in other words, the C-shaped core 202 has a horizontal arrangement). The C-shaped core 202 can be pushed up against the inner wall 206 of the casing 102, as shown in FIG. 2. This can be accomplished by expanding the arm 105 of the corresponding receiver to move radially outwardly to engage the current sensor 200 against the inner wall 206 of the casing 102. Once the magnetic core 202 is pushed against the inner wall 206 of the casing 102, a segment 212 of the casing 102 closes the magnetic path between two poles 208 and 210 of the C-shaped core 202 to form a toroid-like current sensor 200. The remainder of the cross-section of the casing 102 other than the segment 212 is identified as 215 in FIG. 2.

A current I flowing axially in the casing 102 will induce a magnetic field that causes induced voltage (V) on the winding 204 wound around the magnetic core 202. (Note, usually the voltage detection circuit has high input impedance so the current is negligible). Due to the high permeability of the core 200, a significant amount of the magnetic field will close through the core of the sensor. The voltage V is proportional to the current I passing through the casing 102. A voltage detector (represented by box 218 in FIG. 2) in each of the corresponding receivers in the tool string can be used to measure the voltage V at the terminals 214 and 216 of the winding 204.

Prior to actual use, the casing current sensor 200 can be calibrated by performing experiments with known electrical currents injected into various different types of casing. In the experiments (which can be performed in a laboratory or other experimental setting), receiver sensitivity can be measured at various frequencies and amplitudes of synchronized current injected into the casing. Assuming an ideal axial symmetric configuration, the EM receiver should not sense the magnetic field caused by current I (FIG. 1) in the casing 102. In reality, however, the EM receiver effective sensitivity will be affected, to the first order approximation, only by the change of casing magnetic permeability due to the induced current I. The experiments can be repeated for a collection of typical casings for a particular application to establish a lookup table (or other mapping data structure) for relations between the current through the casing and the change of EM receiver sensitivity in casing. The lookup table (or other mapping data structure) can be used during survey operations to map from detected electrical currents in the casing 102 (as detected by the casing current sensor 200) to a change in EM receiver sensitivity. In this way, by measuring casing current using the casing current sensor 200, the change in casing effect due to the induced axial casing current I can be corrected.

The following provides a more detailed explanation regarding how a casing current (I) can induce a voltage in the winding 204 of the casing current sensor 200.

Figure 3A:
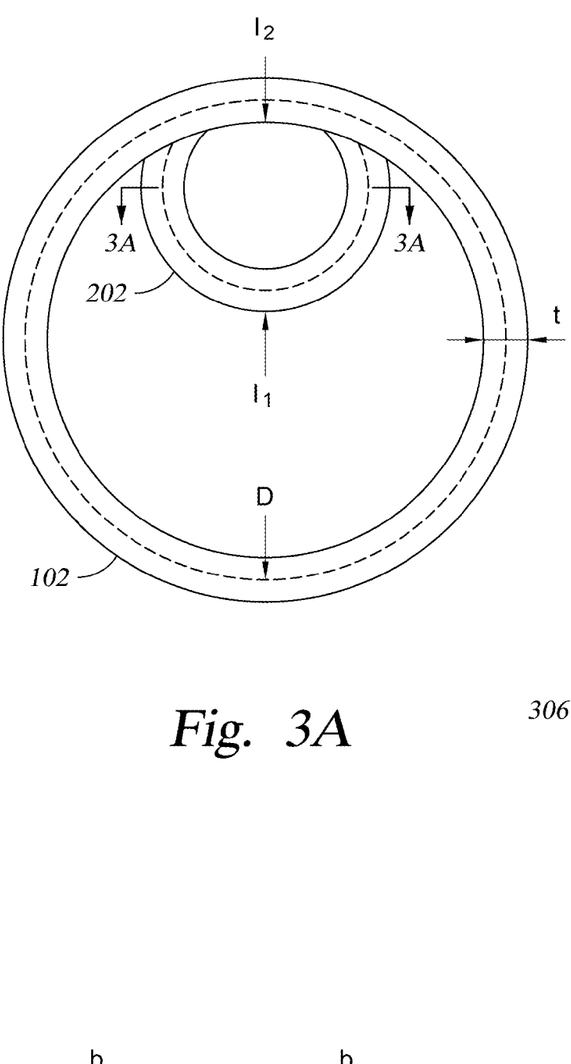
FIG. 3A is a schematic diagram illustrating various parameters associated with the current sensor and casing, according to an embodiment.

To obtain the self inductance L of the casing current sensor 200 when it is placed against the wall of the casing 102, the effective relative magnetic permeability of the sensor $\mu_{effective}$, is estimated using an equivalent magnetic circuit model of FIG. 3A (which is identical to FIG. 2 except various parameters are illustrated). The relative magnetic permeability of the sensor $\mu_{effective}$, can be calculated as the ratio of magnetic reluctance, $R_m$, without and with the magnetic core 202 and casing 102:

$$\mu_{effective\_Rx} = R_{m\_air}/R_{m\_(core+casing)},\quad\text{(Eq. 1)}$$

where the magnetic reluctance without core and casing ($R_{m\_air}$) is $$R_{m\_air} = l_1/s_{core} + l_2/s_{casing},\quad\text{(Eq. 2)}$$

and the magnetic reluctance with core and casing ($R_{m\_(core+closing)}$) can be calculated, to the first order of approximation, as the core reluctance in series with casing reluctance assuming the gaps between the core and casing can be neglected:

$$R_{m\_(core+casing)} = l_1/(\mu_{core} s_{core}) + R_{m\_casing}.\quad\text{(Eq. 3)}$$

In Eq. 2 and 3, $S_{core}$ (a by b) and $S_{casing}$ (a by t) are the cross-section areas of the core 202 and the casing segment 212, respectively, while $l_1$ represents the length of the core 202, and $l_2$ represents the length of the casing segment 212. Since the magnetic flux generated by the winding 204 in FIG. 2 will go through two segments of casing in parallel, the casing magnetic reluctance is calculated as $$R_{m\_casing} = R_{m\_casing1} R_{m\_casing2}/(R_{m\_casing1} + R_{m\_casing2}),\quad\text{(Eq. 4)}$$

where the magnetic reluctance for casing segment 212 (in-between the two poles 208 and 212 of the C-shaped core 202) is $$R_{m\_casing1} = l_2/(\mu_{casing} s_{casing}),\quad\text{(Eq. 5)}$$

and that for the rest of the casing segment 215 is $$R_{m\_casing2} = (D-l_2)/(\mu_{casing} s_{casing}).\quad\text{(Eq. 6)}$$

Figure 3B:
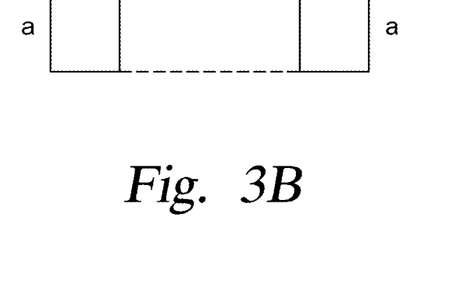
FIG. 3B is a cross-sectional view of a magnetic core in the current sensor of FIG. 3A, according to an embodiment.

Assuming the core has a rectangular cross section of a by b (as shown in FIG. 3B, and the gap between the core and casing can be neglected, one can calculate the effective magnetic permeability using Eq. 1-6:

$$\mu_{effective\_Rx} = \mu_{core}\mu_{casing}(l_1/b + l_2/t)/\{\mu_{casing}(l_1/b) + \mu_{core}(l_2/t)[1 - l_2/(D)]\},\quad\text{(Eq. 7)}$$

where $I_1$ is the length of the core, a is the thickness of the core, b is the width of the core, $I_2$ is the casing segment length between the two poles, t is the casing wall thickness, and D is the average circumference of the casing (see FIGS. 3A and 3B for an illustration of some of these parameters). It is recognized that this is only an approximate calculation and that the sensor will have to be calibrated for any particular situation.

The pickup voltage (V) of the sensor winding 204 can be calculated as:

$$V = -MdI/dt,\quad\text{(Eq. 8)}$$

where M is the mutual inductance between the sensor winding 204 and the casing segment 212 in-between the two poles 208 and 210 of the core 202. The transfer impedance $Z_{transfer}$ of the casing current sensor 200 is given by the following equation:

$$Z_{transfer} = (M/L)R_{load},\quad\text{(Eq. 9)}$$

where L is the self-inductance of the sensor which is proportional to $\mu_{effective\_Rx}$ in Eq. 7, and $R_{load}$ is the load at the current sensor output. The actual design of the casing current sensor 200, e.g., the number of turns of the winding 204 and core 202 dimensions and material, should result in a corner frequency $f_c$ that is lower than the frequency of interest in the EM survey. The following relation holds at the corner frequency if the loss in the core 202 can be neglected:

$$2\pi f_c = R_{load}/L.\quad\text{(Eq. 10)}$$

Therefore the mutual inductance M between the sensor winding 204 and the casing segment 212 in-between the poles 208 and 210 can be calculated from Eqs. 9 and 10, and the axial current I in the casing 102 can be calculated from Eq. 8. as follows:

$$I = V/(i\omega L) R_{load}/Z_{transfer}\quad\text{(Eq. 11)}$$

Once the axial current I in the casing 102 is known, then the table (or other mapping data structure) mentioned above can be used to correct for a change in the magnetic property of the casing 102 and how it affects the sensitivity of the EM receiver.

Figure 4:
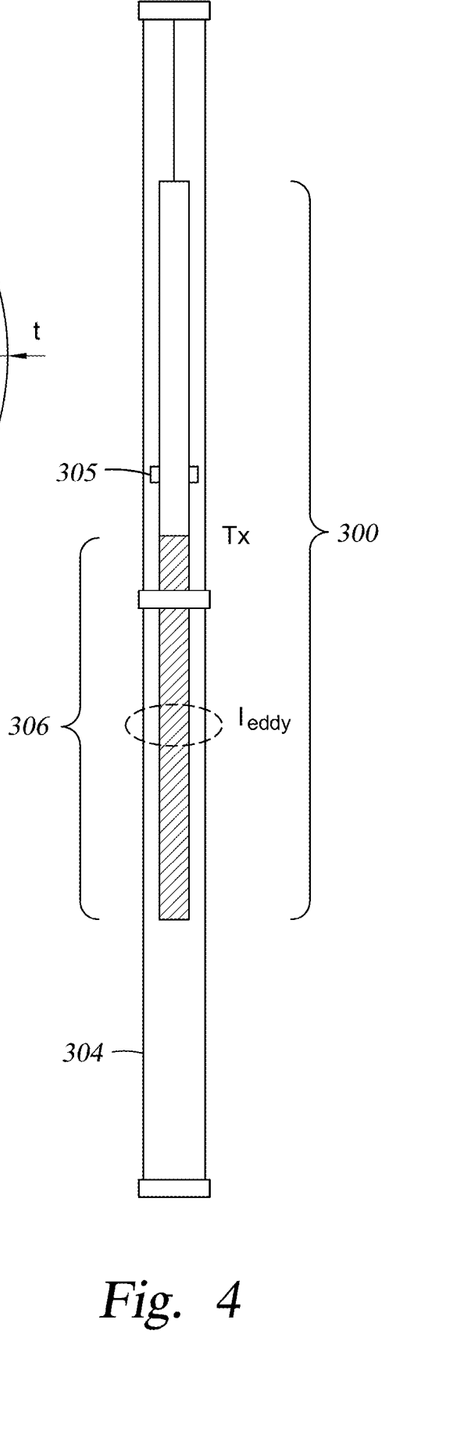
FIG. 4 is a schematic diagram of another exemplary arrangement that includes a transmitter tool string, according to an embodiment.
Figure 5:
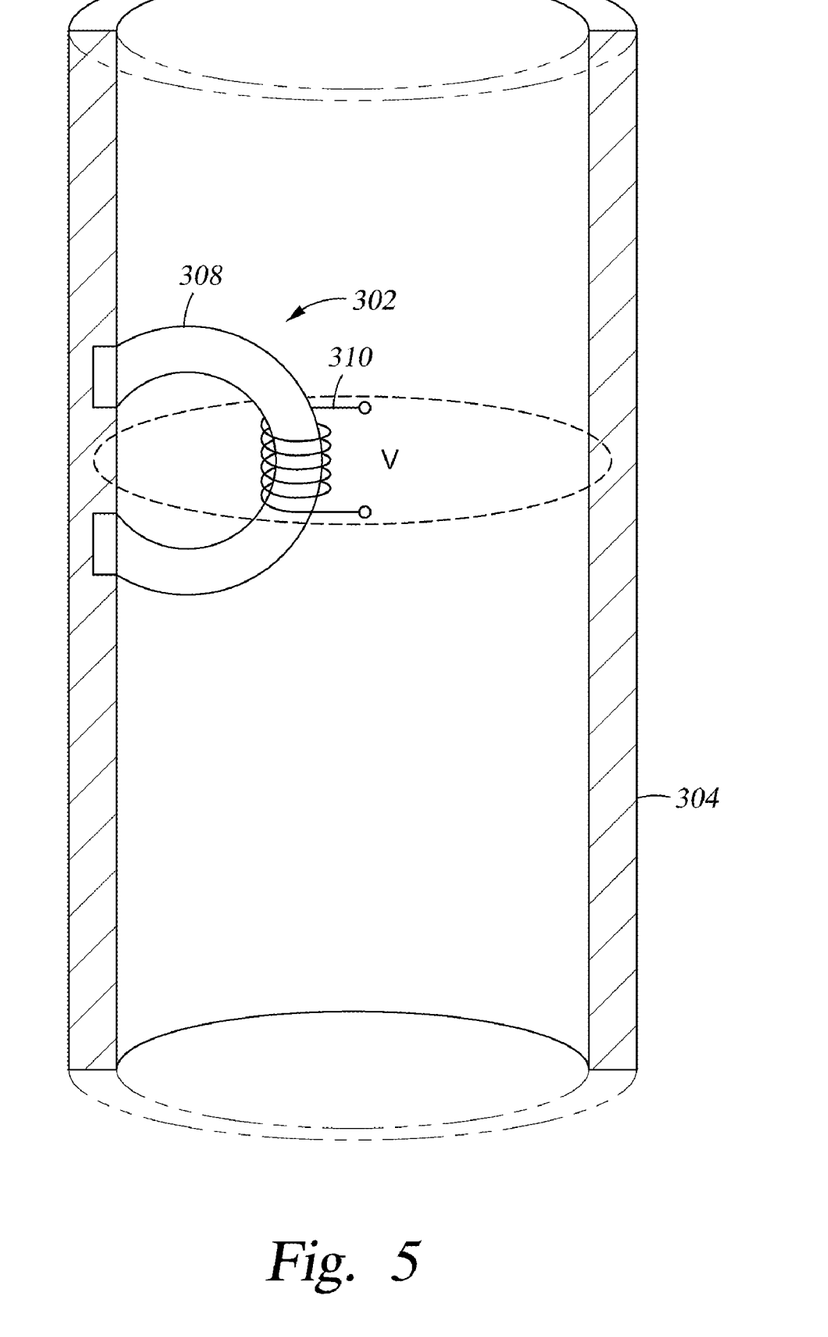
FIG. 5 is a schematic diagram that illustrates a casing current sensor used with the transmitter tool string, according to an embodiment.

In another embodiment, a transmitter casing current sensor 302 (FIG. 5) can be added to a transmitter tool string 300 (FIG. 4) that is provided in a cased wellbore having casing 304. The current sensor 302 can be mounted on an expandable/retractable arm 305 to allow for radial movement of the current sensor 302 to engage the casing 304 or to retract from the casing 304. The transmitter casing current sensor 302 is designed to cover the vertical span of a transmitter coil in the EM transmitter 306 so that the eddy current distribution ($I_{eddy}$) in the casing 102 surrounding the transmitter 306 can be obtained using the casing current sensor 302. As shown in FIGS. 4 and 5, the eddy current $I_{eddy}$ is a current flowing in a direction around the circumference of the casing 304.

The current sensor 302 has a C-shaped magnetic core 308 that is oriented with the "C" being in the axial plane of the casing 304. A winding 310 is mounted around the magnetic core 308, and the eddy current $I_{eddy}$ induced by the induction transmitter can be detected by measuring the voltage (V) induced across the two ends of the winding 310.

The self inductance L of the current sensor 302 in FIG. 5 can be obtained similarly as in the receiver casing current sensor, except that Eq. 4 now becomes $$R_{m\_casing} = R_{m\_casing1}.\quad\text{(Eq. 4a)}$$

Figure 6:
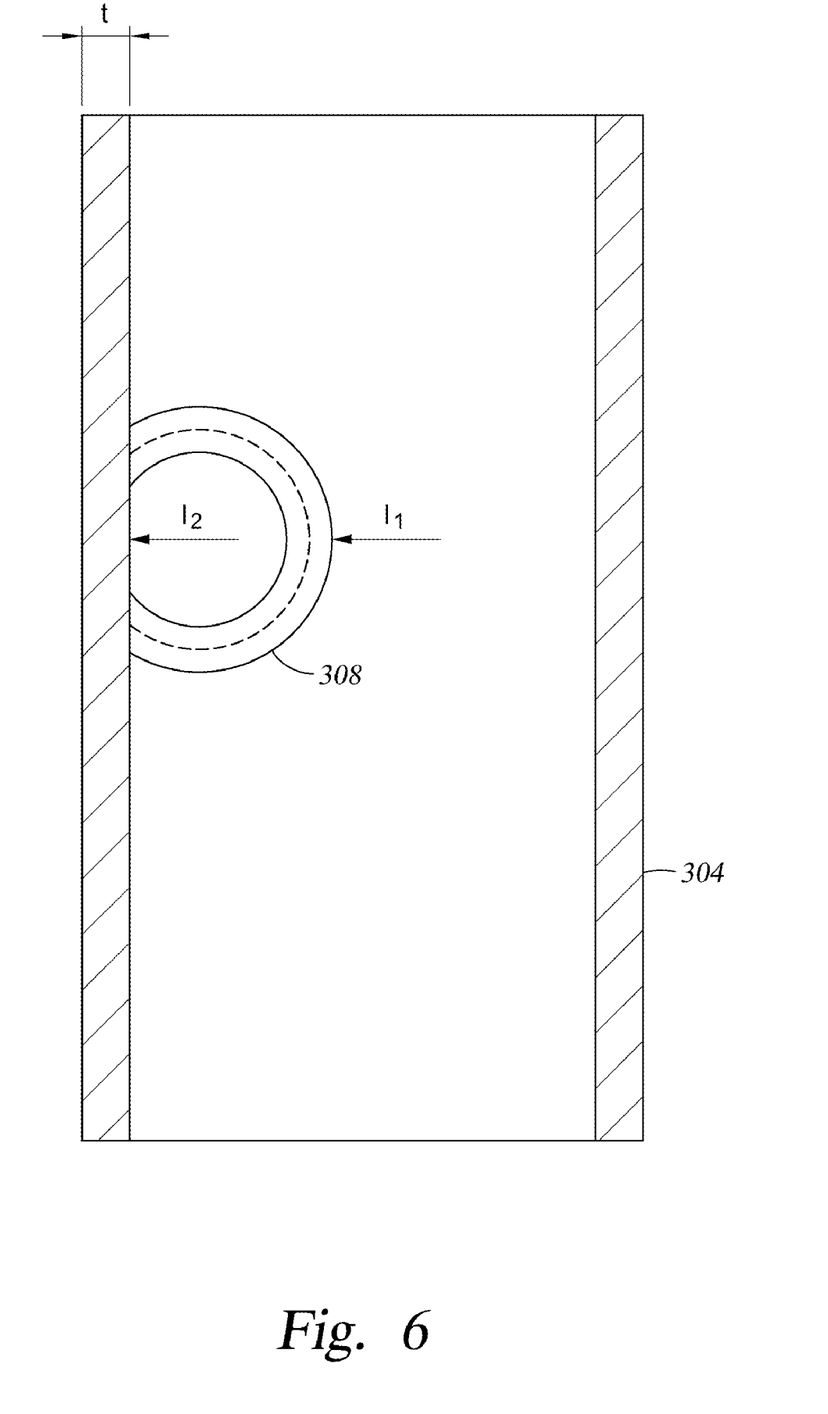
FIG. 6 is a schematic view illustrating various parameters associated with the current sensor and casing of FIG. 5, according to an embodiment.

Note that $R_{m\_casing1}$ is defined by Eq. 5. By solving Eqs. 1-3 and 4a, one obtains the sensor effective magnetic permeability $\mu_{effective\_tx}$ $$\mu_{effective\_Tx} = \mu_{core}\mu_{casing}(l_1/b + l_2/t)/[\mu_{casing}(l_1/b) + \mu_{core}(l_2/t)],\quad\text{(Eq. 7a)}$$

where $l_1$ is the length of the core 308, a is the thickness of the core 308, b is the width of the core 308, $l_2$ is the casing segment length between the two poles of the core 308, and t is the casing wall thickness (see FIG. 6).

The transfer impedance of the current sensor 302 is the same as that of receiver casing current sensor 200 (see Eq. 9 above).

In accordance with further embodiments, Eqs. 7 and 7a show that the self-inductance of the casing current sensor 200 or 302 depends on different casing parameters at different sensor orientations relative to the casing. This implies that if known currents are injected into the casing, measurements of casing current sensor outputs at two different orientations can be used to solve for up to two casing parameters, such as casing relative magnetic permeability $\mu_{casing}$, wall thickness t, and the average casing circumference D (see FIGS. 3A-3B).

Based on the above, by injecting known currents into the well casing, the current sensors 200 and 302 having respective different orientations can be used to take measurements, from which casing inhomogeneities such as different magnetic permeabilities, wall thicknesses, and different casing circumferences (in corresponding different parts of the casing) can be derived.

Figure 7:
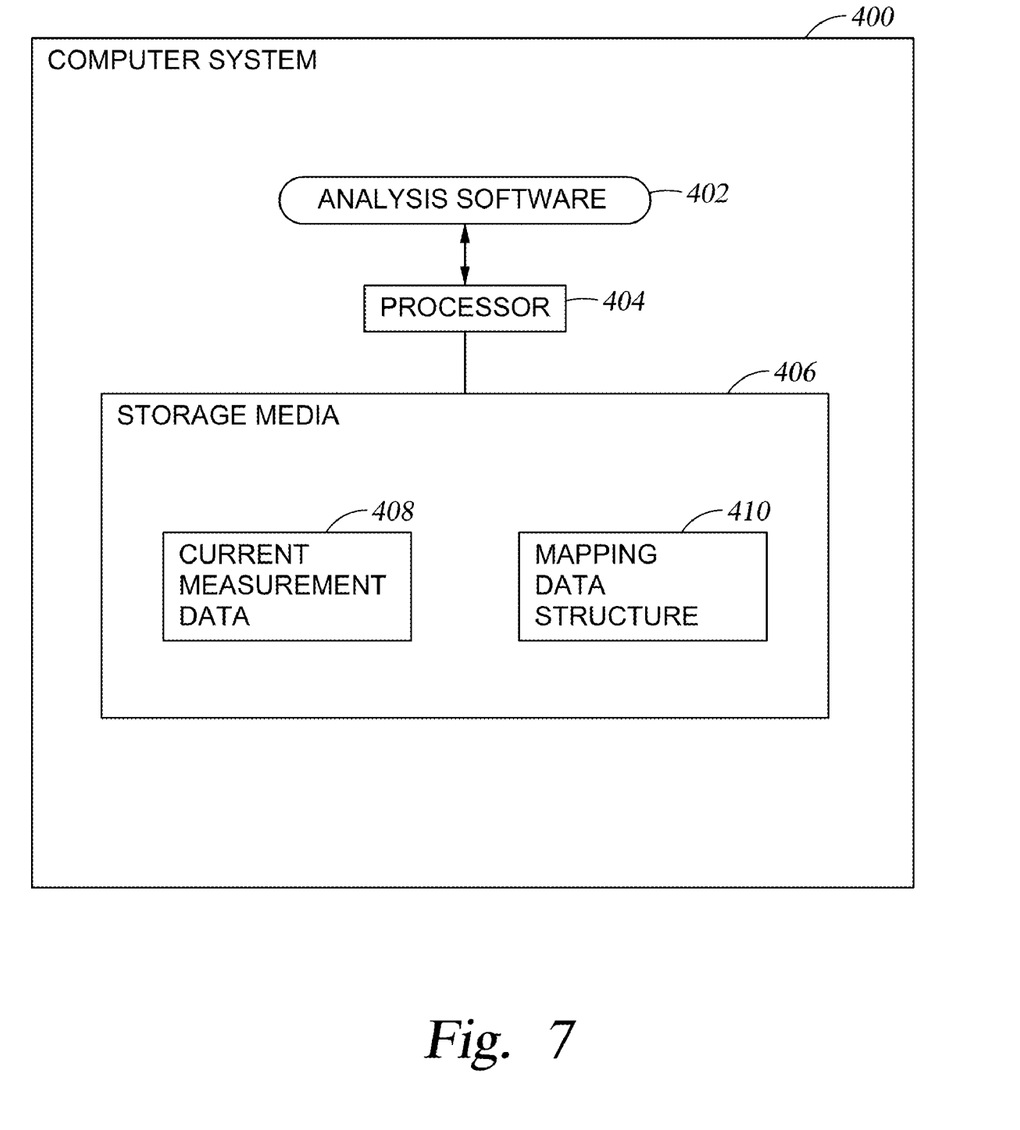
FIG. 7 is a block diagram of a computer system that incorporates an embodiment of the invention.

FIG. 7 illustrates a computer system 400 that can be used to perform tasks according to an embodiment. The computer system 400 includes analysis software 402 that is executable on a processor 404. The processor 404 is connected to storage media 406, which stores current measurement data 408 that had been received from at least one casing current sensor. The storage media 406 can be implemented with one or more disk-based storage devices or integrated circuit (IC) storage devices. Also, the storage media 406 stores a lookup table (or other mapping data structure) 410 that maps values of the casing current (I) to changes in the casing effect. As discussed above, the mapping data structure 410 can be developed by performing experiments in which known currents are provided into different types of casings and corresponding changes in the casing effect are determined.

The tasks that can be performed by the analysis software 402 include one or more of the following. Using measurement data 408 that represents casing currents measured by at least one current sensor (e.g., 200 or 302 in FIG. 2), a change in casing effect can be determined by accessing the mapping data structure 410.

In another application, the measurement data 408 can represent casing currents measured by multiple current sensors (e.g., 200 and 302) having different orientations. The measurement data 408 is collected in response to injection of known electrical current into the casing. The measurement data 408 can then be used to determine if there are inhomogeneities in the casing, such as at least one of the following: different casing magnetic permeabilities in different parts of the casing, different wall thicknesses in different parts of the casing, and different casing circumferences in different parts of the casing.

Figure 8:
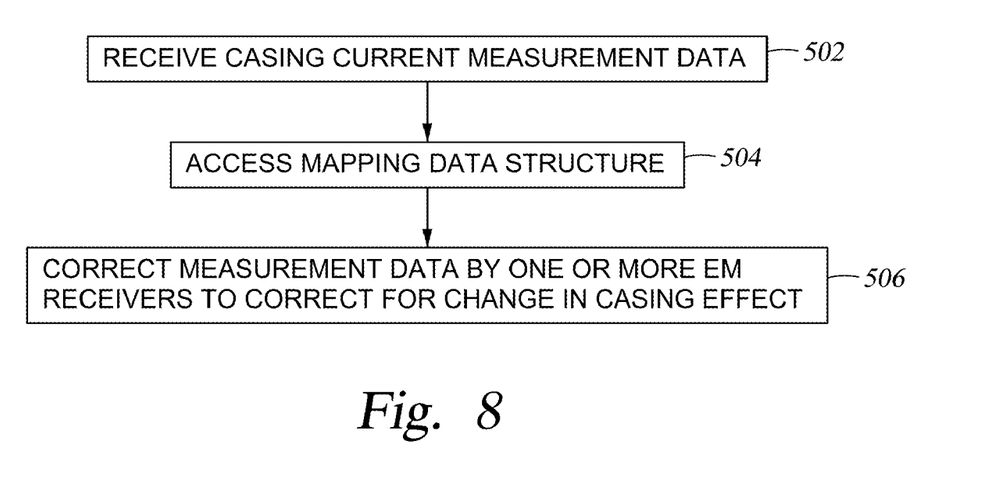
FIGS. 8 and 9 are flow diagrams of processes according to some embodiments. (Note for FIG. 9: "608" should be moved to in-between 604 and 606, and rename "608" to "605")

FIG. 8 is a flow diagram of a process according to an embodiment. The process of FIG. 8 can be performed by the analysis software 402 shown in FIG. 7. The analysis software 402 receives (at 502) casing current measurement data 408. Based on the current measurement data, the analysis software accesses (at 504) the mapping data structure 410 to determine a change in the casing effect. Once the change in the casing effect is determined, measurements made by one or more EM receivers of an induction survey tool string are corrected (at 506) to correct for the change in the casing effect.

Figure 9:
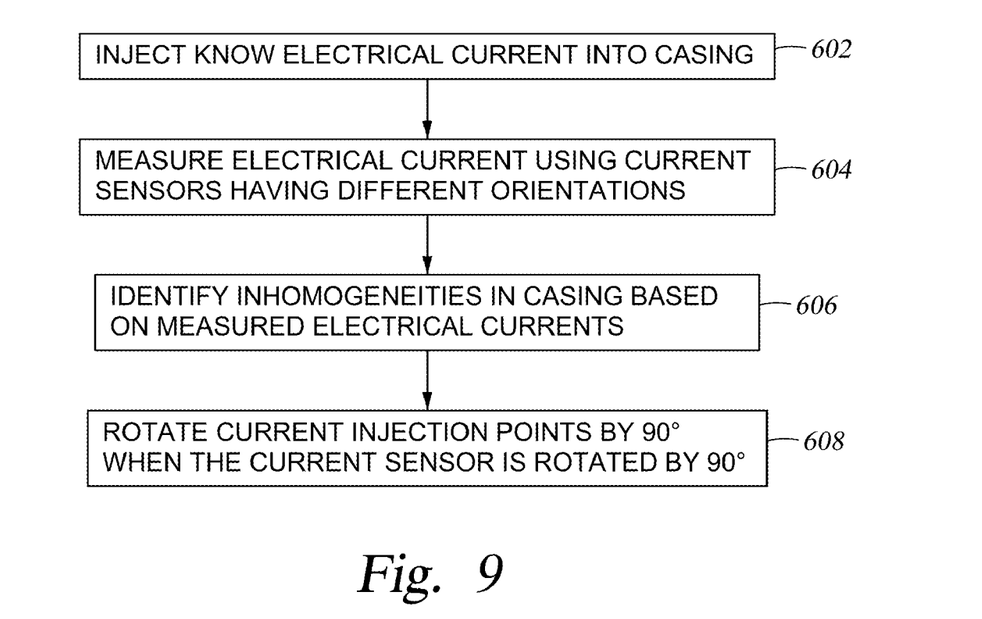

FIG. 9 is a flow diagram of a process according to another embodiment. A known electrical current is injected (at 602) into the casing. Electrical currents are measured (at 604) using current sensors having different orientations that are lowered into the cased wellbore. Inhomogeneities in the casing are identified (at 606) based on the measured electrical currents. It is noted that the known current injection points are rotated (at 605) by 90° degree when the current sensor is rotated by 90°. (Note: 608 should be moved to in-between 604 and 606, and rename 608 to 605)

Instructions of software described above (including the analysis software 402 of FIG. 7) are loaded for execution on a processor (such as processor 404 in FIG. 7). The processor includes microprocessors, microcontrollers, processor modules or subsystems (including one or more microprocessors or microcontrollers), or other control or computing devices. A "processor" can refer to a single component or to plural components (e.g., one or multiple central processing units in one or more computers).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EE-PROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A tool for measuring current flowing in a magnetic structure, comprising:
a magnetically permeable core;
a winding around the magnetically permeable core;
an expandable structure to engage the magnetically permeable core against the magnetic structure in which the current to be measured is flowing; and
a detector to measure a voltage induced in the winding due to the current flowing in the magnetic structure.

2. The tool of claim 1, further comprising a mechanism to calibrate the tool.

3. A tool for performing electromagnetic (EM) induction surveying in a wellbore lined with an electrically conductive casing, comprising:
an EM receiver to receive a magnetic field through the casing; and
a current sensor to measure induced electrical current flowing in the casing during the EM induction surveying, and to output measurement information of the detected electrical current to allow for adjustment of a measurement made by the EM receiver to correct for an effect of a change in a magnetic property of the casing due to the electrical current in the casing.

4. The tool of claim 3, wherein the current sensor comprises a magnetic core and a winding arranged around the magnetic core.

5. The tool of claim 4, wherein when the current sensor is positioned to contact an inner wall of the casing, a segment of the casing closes a magnetic path between two poles of the magnetic core.

6. The tool of claim 5, wherein the magnetic core is generally in a plane that is perpendicular to a longitudinal axis of the casing.

7. The tool of claim 5, wherein the magnetic core generally extends in a direction that is parallel to a longitudinal axis of the casing.

8. A method for use with a cased wellbore lined with a casing, comprising:
lowering a tool into the cased wellbore, wherein the tool has at least one current sensor;
measuring electrical current flowing in the casing using the at least one current sensor;
determining, from the measured electrical current, a change in casing effect on an EM receiver of the tool; and
correcting for the change in the casing effect.

9. The method of claim 8, further comprising:
performing experiments in which known electrical currents are injected into different types of casing to measure corresponding sensitivities of the EM receiver in casing;
creating a mapping data structure to map electrical currents to changes in sensitivity of the EM receiver in casing,
wherein determining the change in the casing effect is based on the mapping data structure.

10. The method of claim 8, wherein measuring the electrical current comprises measuring an eddy current.

11. The method of claim 10, wherein lowering the tool comprises lowering the tool that includes one or more of an EM transmitter and an EM receiver.

12. The method of claim 8, wherein the at least one current sensor comprises plural current sensors having different orientations, the method further comprising:
injecting a known electrical current into the casing;
measuring values representative of the injected electrical current using the plural current sensors.

13. The method of claim 12, further comprising:
identifying casing inhomogeneities based on the measured values from the plural current sensors.

14. The method of claim 13, wherein identifying the casing inhomonogeneities comprises identifying one or more of: different casing magnetic permeabilities in different parts of the casing, different wall thicknesses in different parts of the casing, and different casing circumferences in different parts of the casing.

15. A system comprising:
storage media to store measurement data taken by at least one current sensor provided with a tool into a wellbore lined with casing, wherein the measurement data represents electrical current in the casing; and
a processor to determine a change in characteristic of the casing based on the measurement data.

16. The system of claim 15, wherein the change in the characteristic comprises a change in a casing effect on an electromagnetic (EM) element in the tool.

17. The system of claim 15, wherein the change in the characteristic comprises inhomogeneity of the casing.

18. The system of claim 15, wherein the measurement data is representative of an eddy current in the casing.

19. The system of claim 15, wherein the measurement data is representative of the electrical current that flows along a longitudinal axis of the casing.

20. A tool for performing electromagnetic (EM) induction surveying in a wellbore lined with an electrically conductive casing, comprising:
an EM element to transmit or receive a magnetic field through the casing; and
a current sensor to measure induced electrical current flowing in the casing during the EM induction surveying and comprising a magnetic core and a winding arranged around the magnetic core;
wherein the current sensor is configured to contact an inner wall of the electrically conductive casing such that a segment of the electrically conductive casing closes a magnetic path between two poles of the magnetic core.

21. The tool of claim 20, wherein the magnetic core is generally in a plane that is perpendicular to a longitudinal axis of the casing.

22. The tool of claim 20, wherein the magnetic core generally extends in a direction that is parallel to a longitudinal axis of the casing.

23. The tool of claim 20, wherein the EM element is an EM transmitter to generate the magnetic field, and wherein the current sensor is to measure an eddy current in the casing.

24. A method for use with a cased wellbore lined with a casing, comprising:
lowering a tool into the cased wellbore, wherein the tool has a plurality of current sensors having different orientations;
injecting a known electrical current into the casing; and
measuring values representative of the injected electrical current using the plurality of current sensors.

25. The method of claim 24, further comprising: identifying casing inhomogeneities based on the measured values from the plural current sensors.

26. The method of claim 25, wherein identifying the casing inhomogeneities comprises identifying one or more of: different casing magnetic permeabilities in different parts of the casing, different wall thicknesses in different parts of the casing, and different casing circumferences in different parts of the casing.

* * * * *